Dec. 15, 1942.  G. WHEAT  2,305,121
STORAGE BATTERY
Filed Dec. 15, 1939  2 Sheets-Sheet 1

GLASS FABRIC

INVENTOR
Grant Wheat,
BY
ATTORNEY.

Dec. 15, 1942.  G. WHEAT  2,305,121
STORAGE BATTERY
Filed Dec. 15, 1939   2 Sheets-Sheet 2

INVENTOR
Grant Wheat,
BY
ATTORNEY

Patented Dec. 15, 1942

2,305,121

UNITED STATES PATENT OFFICE 2,305,121

STORAGE BATTERY

Grant Wheat, Marlboro, Mass., assignor to Koelher Manufacturing Company, Marlboro, Mass., a corporation of Massachusetts Application December 15, 1939, Serial No. 309,377

6 Claims. (Cl. 136—55)

This invention relates to storage batteries and is more especially concerned with the plate construction of storage batteries of that type in which the positive plates are composed chiefly of a series of cylindrical or pencil-like electrode elements.

The common commercial plates of this character include a lead grid having a series of rod-like cores or spines, each enclosed in a hard rubber tube which retains a body of lead oxide or other active material in contact with the cores. The tubes are customarily slotted to provide for the free access of electrolyte to the active material.

This type of battery is very useful for certain types of service and the present invention aims to improve both the construction and also the methods of manufacture of the tubular plates used in them with a view to making them even more efficient and reliable than prior constructions have been.

The nature of the invention will be readily understood from the following description when read in connection with the accompanying drawings and the novel features will be particularly pointed out in the appended claims.

Figure 1:
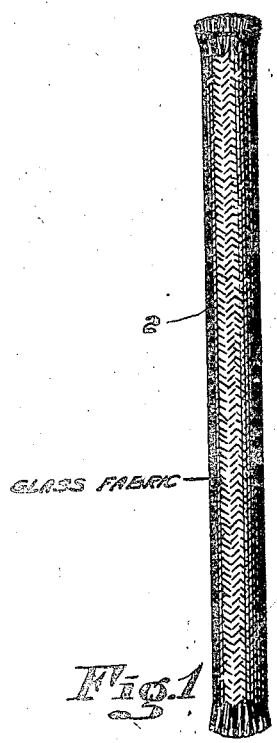
Figure 1 is a side elevation of a fabric tube of a form preferably used in accordance with this invention.

Preliminary to a detailed description of the constructions shown in the drawings, it is pointed out that the invention proposes to utilize the advantages of glass fiber or glass wool in batteries of the type above referred to. For this purpose the invention contemplates the replacement of the hard rubber or vulcanite tubes customarily used heretofore with tubes made from glass fiber yarn or thread by weaving, braiding, or other textile fabricating operations. Such tubes can readily be manufactured to close dimensions and of sufficiently fine mesh to prevent any substantial passage therethrough of the active material of the plate. The production of such a plate, however, by commercially feasible methods involves problems quite different from those heretofore existing in the manufacture of articles of this character, and an important object of this invention has been to devise a satisfactory solution for these problems.

Referring first to Fig. 1, a short length of glass fabric tubing is there shown at 2. As this material comes from the loom or braider it is limp and pliable and the cut ends tend to ravel badly in ordinary handling. In order to condition it for assembly in a battery, it must be made self-sustaining. It is also highly desirable, although perhaps not absolutely necessary, that these qualities be retained indefinitely while the battery is in operation. According to the present invention, therefore, suitable lengths of this tubing are drawn on to an arbor and are impregnated with some stiffening material, preferably of such a nature that it will not be soluble in or otherwise adversely affected by the sulphuric acid electrolyte commonly used in storage batteries, nor will it react unfavorably with the electrolyte or other substances with which it comes in contact while in the battery.

The best materials which I have found for this purpose are the polymerized unsymmetrical ethylene derivative resins. This class of substances includes vinyl resins, such as methyl methacrylate and polystyrene. I prefer to use the last named material. It is the chemical name for polymerized styrene. In its unpolymerized condition it is highly fluid, but its viscosity increases upon polymerization and with the degree to which that process is carried. The highly polymerized product is glass hard. However, it may be dissolved in practically any aromatic hydrocarbon, such as toluene. It is also soluble in carbon tetrachloride. The solution used for impregnaitng purposes should be sufficiently dilute, usually not over 20% solids, to avoid any danger of plugging the pores of the fabric 2. Also, the quantity of material added in this impregnating process should not be sufficient to make the tubes rigid but should give them the firmness and stability necessary to make them self-sustaining and capable of resisting deformation under light pressures while still having a substantial degree of resilience or yield.

Figure 2:
Fig. 2 is a vertical, sectional view of the tube at a subsequent stage in its manufacture.

After the impregnated tubes have dried, they are cut to a length slightly longer than that required for the finished tubes and their ends then are folded over upon themselves so that their extremities and the portions thereof immediately adjacent thereto, consist of a double-walled tube, as shown at a—a, Fig. 2.

In some cases where permanent stiffness of the entire fabric tube is not necessary, only the desired portions of it may be impregnated. In some of these cases, also, a stiffening medium such as albumen, starch, or the like, may be used during the shaping of the tube to its final form, this agent subsequently being washed out.

Figure 3:
Fig. 3 is a side view of a lining or reinforcing sleeve which is sometimes used with such a tube.
Figure 4:
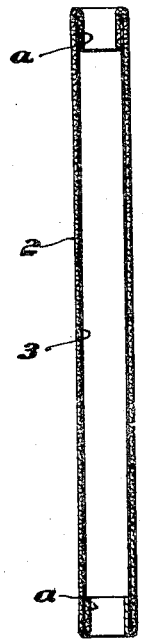
Fig. 4 is a sectional view of the tube with the reinforcing element in it.

Another variation, also, of this process of preparing the tubes for assembly in a battery plate is illustrated in Figs. 3 and 4. Here a sleeve 3 of some suitable sheet material, such as paper or, more preferably, a glass fiber paper, is slipped into the glass fabric tube 2 preparatory to turning over the ends a—a. This sleeve serves to stiffen the tube during the latter operation as well as performing functions which sometimes are valuable later on, particularly in preventing any sifting or "shedding" of the particles of active material through a coarser meshed fabric tube than that ordinarily preferred.

The turning of the ends a—a may be performed with equipment such as that commonly used in machine shops for doing such work on thin metal or paper tubes.

Figure 5:
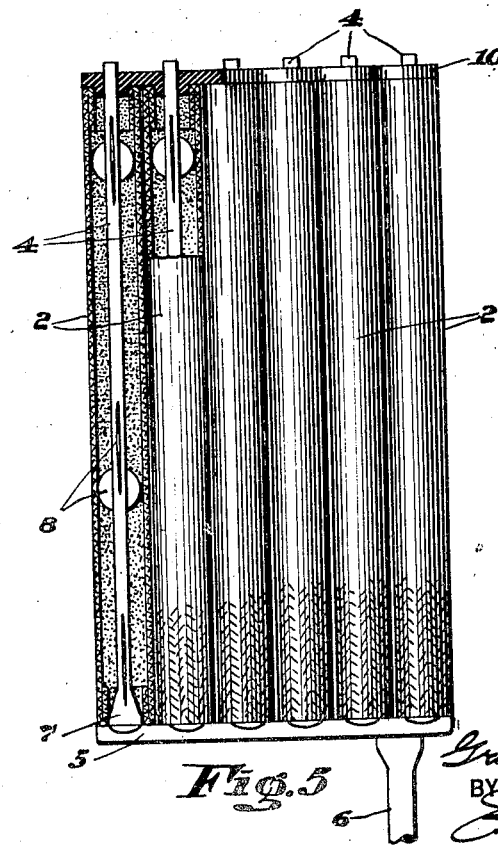
Fig. 5 is a side elevation, with some parts in vertical section, of a practically completed plate.

Tubes prepared in the manner above described are next assembled on a lead grid of the type commonly used heretofore in the manufacture of battery plates of this character. Referring to Fig. 5 it will be seen that such a grid comprises a series of rods or splines 4, cast integral with a bar or bus 5 from which a stem 6 also extends. At the points where the cores 4 approach the bar they are gradually enlarged or tapered and terminate in a circular form at their junction with the bar, as indicated at 7 in Fig. 5. The internal diameter of the folded sections a of the tube is made such as to fit snugly on to these portions 7. A series of fins 8 projecting radially from the cores serve to center the tubes.

After the tubes have been placed on the cores, they are then filled with lead oxide or any other active material which is to be used. This operation may be performed in the usual manner and with the aid of customary equipment.

Figure 8:
Fig. 8 is a plan view of a cap forming one element of the plate.

Next, the upper or open ends of the tubes are closed. This is best accomplished by forcing a previously shaped cap plate 10, Figs. 5 and 8, on to the projecting ends of the cores 4. Preferably the lower side of the cap 10, as shown in Fig. 5, has a series of annular grooves or sockets formed therein of suitable dimensions to receive the upper ends of the tubes. With this construction, if the parts are made of proper dimensions, the tubes are effectively sealed against the escape of active material from them. The cap may be made of vulcanite or any other suitable material. After it has been properly positioned, the projecting ends of the cores should be slightly flattened laterally so that the cap will not be forced materially away from the ends of the tubes by the subsequent "growth" or swelling of the active material.

The completed tubes prepared as above described possess a number of advantages over those of the usual slotted hard rubber type. In operation, the walls of the latter, except at the slots, are practically impermeable to the passage of current, while the slots, even though narrow, are large enough to permit more or less of the active material to pass through them and eventually to cause short circuiting and thus ruin the battery. On the other hand, the tubes prepared in accordance with the present invention have walls which are essentially uniformly porous over their entire area, thus readily permitting the passage of current at all points. Batteries in which such tubes are used therefore have a considerably lower internal resistance than do batteries in which the usual slotted tubes are used. Furthermore, the pores in the walls of the tubes of this invention are so small that the active material passes through them with great difficulty, if at all. Short circuits from this source are therefore practically entirely eliminated. These tubes also have sufficient resilience and pliability to accommodate the swelling or growth of the active material during operation, whereas the usual hard rubber tubes, being unyielding, tend, under such conditions, to warp or even to split, while the active material tends to force itself through the slots.

Figure 6:
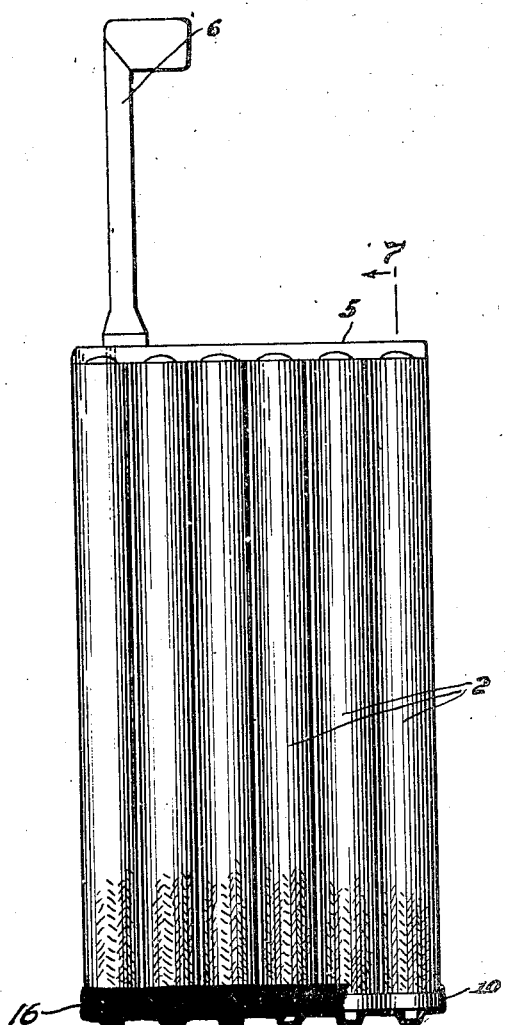
Fig. 6 is a side elevation showing a plate made by this method but sealed in a somewhat different manner.
Figure 7:
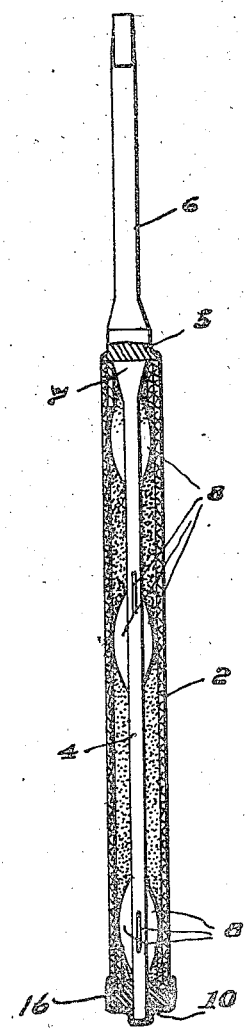
Fig. 7 is a vertical, sectional view approximately on the line 1—1, Fig. 6.

Another method of sealing the tubes which is sometimes useful, particularly with a plain cap 10 is used, is shown in Figs. 6 and 7. Here the construction is like that above described, except perhaps for the formation of the cap plate. After the assembling, filling and capping operations have been performed, the cap, and the parts immediately adjacent thereto, are submerged in a bath of hot wax, or a rubber composition, or in any sealing medium having similar characteristics. Such sealing compounds as those commonly used in connection with the manufacture of storage batteries are suitable for this purpose. The coating 16 so applied closes any crevices and bonds the tube ends to the cap. Such a sealing composition may also be applied to the upper ends of the tubes where they join the bar 5, if desired, but this is rarely necessary.

Figure 9:
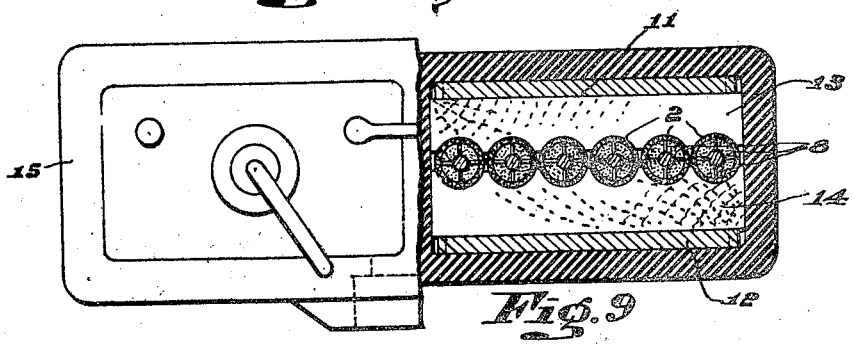
Fig. 9 is a plan view, partly in horizontal section, of a battery in which a positive plate like that shown in Figs. 5 and 6 is incorporated.

Fig. 9 shows a two-cell battery with one cell in cross-section, the latter being equipped with a positive plate of the construction shown in Figs. 5 or 6. Negative plates cooperating with the positive plate above described are indicated at 11 and 12 and the separators at 13 and 14. The latter preferably are so shaped as to fit snugly around the tubes 2, encircling them so far as possible, and the assembly of plates and separators substantially fills the horizontal cross-section dimensions of the cell in the battery jar 15.

The value of glass fiber in storage batteries has been demonstrated in other forms of batteries, and the present invention provides a practical means for utilizing those advantages in the type of battery above described.

While I have herein shown and described preferred embodiments of my invention, it is contemplated that departures from this disclosure may be made within the spirit and scope of the invention. For example, the glass yarn from which the tube is braided or woven may be impregnated prior to performing these operations instead of impregnating the fabricated product.

Having thus described my invention, what I desire to claim as new is:

1. A storage battery plate including an electrode element comprising a glass fabric tube, a body of active material enclosed in said tube, one end at least of said tube being folded upon itself.

2. A storage battery plate including an electrode element comprising a glass fabric tube, a body of active material enclosed in said tube, said tube being impregnated with a stiffening agent which is non-soluble in a normal sulphuric acid electrolyte for the battery, and the ends of said tube being folded upon themselves.

3. A storage battery plate including an electrode element comprising a glass fabric tube, a body of active material enclosed in said tube, one end at least of said tube being folded upon itself, and a sleeve fitting snugly in said tube and having a substantial proportion of glass fiber in its composition.

4. A storage battery plate including an electrode element comprising a glass fabric tube, a body of active material enclosed in said tube, and a sleeve of sheet material fitting snugly in said tube, said sleeve being highly pervious to the passage of the electrolyte, one end at least of said fabric tube being folded over the end of said sleeve.

5. A storage battery plate including an electrode element comprising a glass fabric tube, a body of active material enclosed in said tube, said tube being impregnated with polystyrene, said tube being highly pervious to the passage therethrough of the ionized particles created during the operation of the battery, and one end at least of said tube being folded upon itself.

6. A storage battery plate of the type comprising a series of cores or rods of conducting material encased in a non-conducting retainer, each core being surrounded by active material in loose or granular form held in place by said retainer, and all of said cores being electrically connected together at one end of the plate, characterized by the fact that each retainer comprises a glass fabric tube impregnated with polystyrene, the ends of said tube being folded upon itself and permanently sealed at its ends against the escape of said active material.

GRANT WHEAT.